(12) United States Patent
Murugesan et al.

(10) Patent No.: US 10,337,414 B2
(45) Date of Patent: Jul. 2, 2019

(54) DEVICES AND METHODS FOR EARLY PREDICTION OF IMPENDING INSTABILITIES OF A SYSTEM

(71) Applicant: INDIAN INSTITUTE OF TECHNOLOGY MADRAS, Chennai (IN)

(72) Inventors: Meenatchidevi Murugesan, Chennai (IN); Vishnu R Unni, Chennai (IN); Vineeth Nair Vinod, Chennai (IN); Sujith Raman Pillai Indusekharan Nair, Chennai (IN)

(73) Assignee: INDIAN INSTITUTE OF TECHNOLOGY, MADRAS (IITM), Chennai (IN)

( * ) Notice: Subject to any disclaimer, the term of this patent is extended or adjusted under 35 U.S.C. 154(b) by 193 days.

(21) Appl. No.: 15/308,078

(22) PCT Filed: Apr. 27, 2015

(86) PCT No.: PCT/IB2015/053049
§ 371 (c)(1),
(2) Date: Oct. 31, 2016

(87) PCT Pub. No.: WO2015/166396
PCT Pub. Date: Nov. 5, 2015

(65) Prior Publication Data
US 2017/0051683 A1    Feb. 23, 2017

(30) Foreign Application Priority Data

Apr. 29, 2014    (IN) ............................ 2168/CHE/2014
Oct. 27, 2014    (IN) ............................ 5350/CHE/2014

(51) Int. Cl.
*F02C 9/48*    (2006.01)
*F23N 5/20*    (2006.01)
(Continued)

(52) U.S. Cl.
CPC ............... *F02C 9/48* (2013.01); *F23M 11/04* (2013.01); *F23N 5/203* (2013.01); *F23N 5/242* (2013.01);
(Continued)

(58) Field of Classification Search
None
See application file for complete search history.

(56) References Cited

U.S. PATENT DOCUMENTS

| 7,454,892 | B2  |   | 11/2008 | Lieuwen et al. |
|-----------|-----|---|---------|----------------|
| 10,047,679 | B2 | * | 8/2018 | Jiang ..................... F02C 9/46 |
| 2005/0056024 | A1 | * | 3/2005 | Lieuwen ............... F23D 14/725 60/779 |
| 2005/0274116 | A1 |  | 12/2005 | Thornton et al. |

(Continued)

FOREIGN PATENT DOCUMENTS

EP    1327824 A1    7/2003

OTHER PUBLICATIONS

International Preliminary Report on Patentability for Application No. PCT/IB2015/53049, dated Nov. 1, 2016, 5 pages.
(Continued)

*Primary Examiner* — Navid Ziaeianmehdizadeh
(74) *Attorney, Agent, or Firm* — Convergence Intellectual Property Law P.C.; Jonathan Garfinkel

(57) ABSTRACT

The invention includes a method for predicting the operational state of equipment with turbulent flow characterized by time series data relating to its operation. The invention further includes a system and method for predicting the onset of an impending oscillatory instability. Further, the invention includes a system and method for identifying an impending absorbing transition such as flame blowout in combustion systems. A variable representing the dynamics of operation is measured with the help of a sensor, to obtain time series data. A complex network is then derived from the measured time series data. Network properties are then calculated using the complex network to identify the state of
(Continued)

stability relating to operation of the equipment. The stability information may include one of thermoacoustic instability, aero-elastic instability such as flutter, flow-induced vibration, magneto-hydrodynamic, aerodynamic, aeromechanical, aero-acoustic instability or onset of flame blowout of a combustor.

24 Claims, 17 Drawing Sheets

(51) Int. Cl.
  *F23N 5/24* (2006.01)
  *F23M 11/04* (2006.01)
  *G05B 23/02* (2006.01)
(52) U.S. Cl.
  CPC ............................. *G05B 23/0221* (2013.01); *F23R 2900/00013* (2013.01); *Y02T 50/677* (2013.01)

(56) References Cited

U.S. PATENT DOCUMENTS

2007/0239003 A1  10/2007  Shertukde et al.
2008/0109730 A1*  5/2008  Coffman ................ G06Q 30/02
                                                              715/733
2012/0131925 A1  5/2012  Mittricker et al.

OTHER PUBLICATIONS

International Search Report and Written Opinion for Application No. PCT/IB2015/53049, dated Sep. 29, 2015, 7 pages.
Mukhopadhyay A., "Lean Blow-Out Prediction in Gas Turbine Combustors Using Symbolic Time Series Analysis," Journal of Propulsion and Power, Jul.-Aug. 2013, vol. 29 (4), pp. 950-960.
Thiruchengode M., et al., "An Active Control System for LBO Margin Reduction in Turbine Engines," 41st Aerospace Sciences Meeting and Exhibit, Jan. 6-9, 2003, American Institute of Aeronautics and Astronautics, Inc., Reno, Nevada, 11 pages.

* cited by examiner

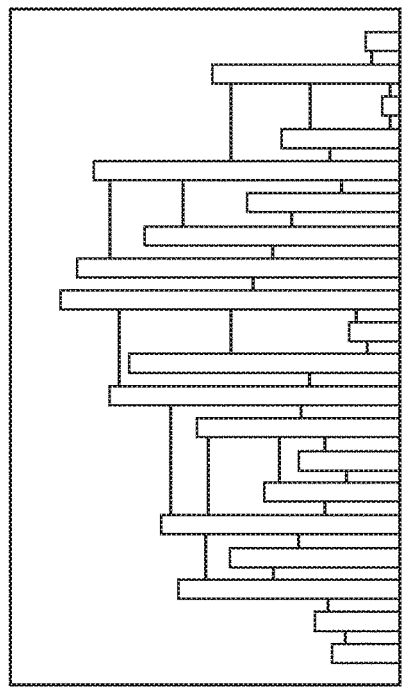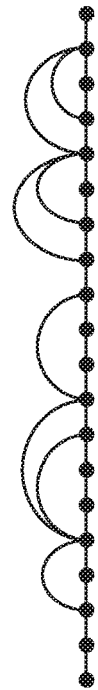
FIG. 6A
FIG. 6B
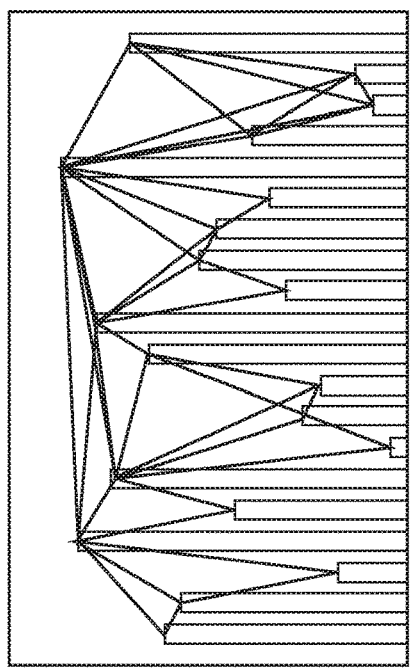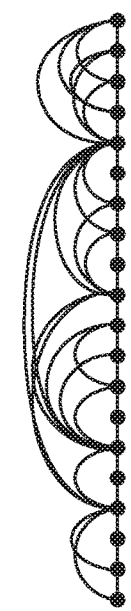
FIG. 5A
FIG. 5B

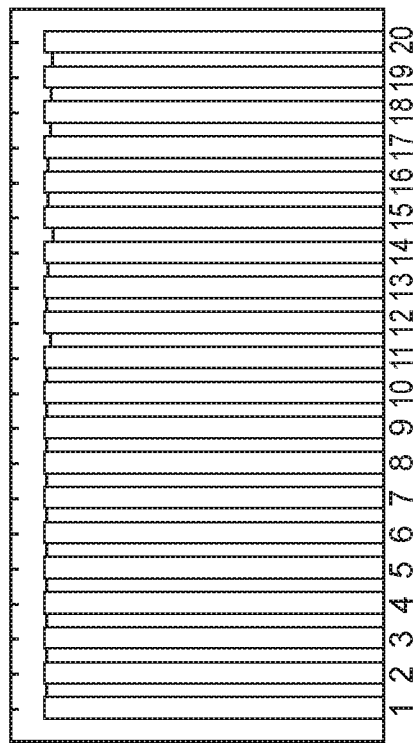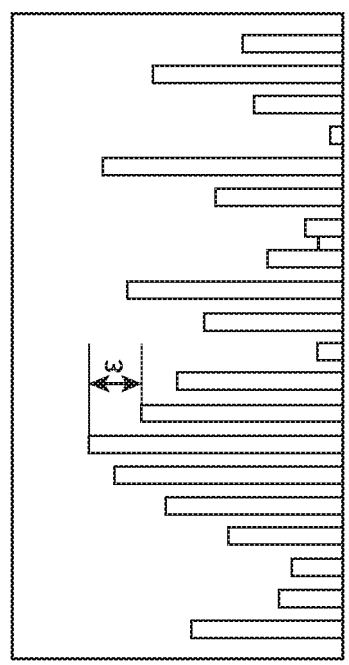
FIG. 7A
FIG. 7B
FIG. 8A
FIG. 8B

DEVICES AND METHODS FOR EARLY PREDICTION OF IMPENDING INSTABILITIES OF A SYSTEM

CROSS-REFERENCES TO RELATED APPLICATIONS

This application is a national stage entry under 35 U.S.C 371 od PCT International application PCT/IB32015/053049 filed on Apr. 27, 2015 which claims priority to Indian provisional patent application Nos. 2168/CHE/2014 filed on 29 Apr. 2014 and 5350/CHE/2014 filed on 27 Oct. 2014, the full disclosures of which are incorporated herein by reference.

FIELD OF THE INVENTION

The present disclosure relates to systems, devices, and methods for identifying the state of a system characterized by time series data relating to its operation. Embodiments of the present disclosure can detect the proximity of a system to an impending transition.

DESCRIPTION OF THE RELATED ART

In a large class of systems, transition to instability is associated with the generation of well-defined oscillatory behavior from a background of seemingly noisy/chaotic signals. Such oscillations affect the performance and lifetime of the systems.

The occurrence of such instabilities in practical systems or devices remains a challenging problem to the industry as they may be driven by a variety of flow and/or combustion processes coupled with one or more of the acoustic modes of the device (e.g. a combustor). Since only a small fraction of the available energy from combustion is sufficient to drive such instabilities and the corresponding attenuation in the combustion chambers is weak, large amplitude pressure oscillations are easily established in these systems resulting in performance loss, reduced operational range and structural degradation due to increased heat transfer.

The current solution adopted by designers is to incorporate sufficient stability margin into the design to prevent instabilities from occurring even in the worst possible scenario. Setting such conservative estimates on operational regimes leads to various problems in the performance and emissions. For example, in a combustor, conservative margins lead to increased levels of NOx emissions, making it more difficult to meet demanding emission norms.

The recent focus on better emission standards for power plants has encouraged engineers to reduce harmful oxides of nitrogen ($NO_X$) emissions from industrial combustion systems. $NO_X$ are produced as a result of the reaction of nitrogen and oxygen in air during combustion, especially at very high temperatures. Hence, reducing the combustion temperature will result in reduction of $NO_X$ production. One of the most effective ways to reduce combustion temperature and thereby, emission of harmful gases is to employ lean premixed combustion. However, lean combustion poses new challenges. At lean equivalence ratios, combustion systems are prone to phenomena such as thermoacoustic instabilities and flame blowout. Hence, having better controllability of combustion systems close to this stability margin becomes critical. Unexpected blowout in a combustion system can cause many problems. Flame blowout means that the flame has gone completely out of the engine. In aircraft, flame blowout of engine combustors will lead to loss of thrust and can be disastrous. Reigniting the engine during certain flight regimes can be highly challenging or even impossible.

In the case of a land based gas turbine engine such as a power generation system, recovering from a flame blowout and reestablishing the steady state operating conditions will cause interruption in power production, which can lead to significant financial losses. Hence, in such situations, a robust prediction system which can want the operator about an impending flame blowout can be of immense help and can enable a larger operational range for the combustor.

Hobson et al. (2000) measured dynamic pressure in industrial gas turbines and calculated the frequency and bandwidth; however, did not provide quantitative measures. Johnson et al. (2000) performed experiments on small scale combustors and measured the response of heat release rate fluctuations to flow fluctuations and the response of flow fluctuations to heat release fluctuations. However, both of these methods can only indicate instability after it has actually occurred and are therefore not predictive.

An active control which can enable turbine engine combustors to operate safely closer to the flame blowout limit, even in the presence of disturbances was designed by Muruganandam et al. ("An Active Control System for LBO Margin Reduction in Turbine Engines", 41st Aerospace Sciences Meeting and Exhibit, American Institute of Aeronautics and Astronautics). This system uses OH* chemiluminescence and threshold based identification strategy to detect flame blowout precursor events. Once precursors are detected, the input fuel-flow is redistributed (using a pilot fuel flow) within the combustor in such a way that the equivalence ratio near the stabilization region of the combustor is increased. This active control was found to extend the flame blowout limit to leaner mixtures. The same group also developed a method to detect flame blowout precursors from acoustic measurements (U.S. Pat. No. 7,454,892 B2).

Mukhopadhyay et al. developed a strategy for prediction of flame blowout in gas turbine combustors based on symbolic time series analysis ("Lean Blow-Out Prediction in Gas Turbine Combustors Using Symbolic Time Series Analysis", Journal of propulsion and power, Vol. 29, No. 4 (2013), pp. 950-960. doi: 10.2514/1.B34711). In this technique, the time series data from an optical sensor was partitioned into a finite number of cells, each of which was assigned a particular symbol. Depending upon the probability of finding a data point in each cell (or each symbol) a state vector was constructed each symbol being a state variable). A state which is farthest away from the flame blowout regime was considered as the reference state. At any particular operational condition, the corresponding state vector is compared to the reference state vector. Near to flame blowout, the state vector was found to be most deviated from the reference vector. This deviation was used as an anomaly measure to detect flame blowout. It was found that the anomaly measure varied rapidly as the operating conditions approached a flame blowout regime.

EP1327824A1 discloses a technique where dynamic pressure data from a combustor was analyzed in order to find precursors to flame blowout in gas turbine combustion operation. The relative strength and variation of two components of the frequencies simultaneously present in the pressure signal was chosen as an indicator for the proximity to blowout in this case. Chorpening et al. developed an apparatus and a method for detecting incipient flame blowoff conditions in a lean premixed combustion nozzle of a gas turbine ("Lean blowoff detection sensor", US 20050274116 A1, Publication date: 25 Dec. 2005). The concentration of hydrocarbon ions and/or electrons produced by combustion was monitored as to detect incipient flame blowoff conditions.

The present disclosure addresses at least some of the drawbacks of conventional methods and satisfies the need for a method and a system that is indicative of the proximity and state of the system to such instability and flame blowout for the safe operation of practical devices such as gas turbine engines, with further related advantages as set forth here.

SUMMARY OF THE INVENTION

A system and method for predicting the onset of an event in turbulent systems is disclosed. The system comprises a measuring unit configured to measure one or more dynamic characteristics of the turbulent system to obtain time series data. It further comprises a computing system comprising a processor, memory and signal conditioning circuitry used for processing the time series data. The memory comprises instructions for the processor to process the time series data to derive a complex network. In various aspects, the complex network is derived by processing using a method selected from one of visibility graph, horizontal visibility graph, or threshold. The instructions further cause calculation of network properties using the complex network and to compare the calculated network properties with that of set operating conditions to identify onset of instability or transition. Further, in some aspects a control signal is generated if the onset of impending instability or transition is identified. In one embodiment the system may further comprise a control unit configured to alter one or more operating inputs to restore stable operation of the system, in response to the control signal.

In one aspect, a method for identifying the state of a system characterized by time series data relating to its operation is disclosed. In one aspect, the method comprises measuring a variable to obtain time series data representing the dynamics of the system. The time series data is processed to derive a complex network by a method selected from one of visibility graph, horizontal visibility graph or threshold grouping. One or more network properties are then calculated from the complex network. The network properties are then compared with that of set operating conditions in the system to identify the state of the system. The state of the system comprises stability, oscillatory instability or an absorbing transition such as that to flame blowout, of the system.

Further, in one aspect, the method generates at least one control signal, or a warning, if instability or transition of the system is identified. In various embodiments the instability of the system is one of oscillatory instability, thermoacoustic instability, combustion instability, aero-elastic flutter, flow-induced vibration, magneto-hydrodynamic, aerodynamic, aeromechanical, aero-acoustic instability, or impending flame blowout. In some embodiments the processing may further comprise one or more of signal conditioning or A/D conversion. In various aspects, the control signal alters one or more operating inputs for maintaining stability of the system.

The network properties may comprise degree of a node, clustering coefficient of a node, average clustering coefficient, shortest path length, characteristic path length or global efficiency.

In one aspect, a method for identifying the onset of flame blowout in combustion systems is disclosed. The method comprises measuring a variable in a combustor to obtain time series data. One or more network properties are then calculated from the complex network. The network properties are then compared with that of set operating conditions in the system to identify the onset of flame blowout in the system.

In various aspects, the complex network is derived by processing using a method selected from one of visibility graph, horizontal visibility graph, or threshold grouping. The network properties used in the method may comprise degree of a node, clustering coefficient of a node, average clustering coefficient, shortest path length, characteristic path length or global efficiency. In some aspects of the method, for visibility and horizontal visibility graphs, the value of the network properties clustering coefficient or global efficiency increase to a positive value from zero to signify impending flame blowout. In one aspect of the method, for threshold grouping, the value of clustering coefficient drops to signify impending flame blowout.

The method in some embodiments may further comprise generating at least one control or a warning signal, if the onset of flame blowout is identified. The control signal in some embodiments may alter one or more operating inputs to prevent an impending blowout in the system. In some aspects the operating inputs may include air or fuel flow rate, degree of premixing or preheat temperature of air or fuel, length of the flame, fuel splitting, distribution of fuel or fuel injection. In some aspects, the processing the time series data may further comprise signal conditioning and A/D conversion. In some aspects, the time series data may be acoustic fluctuation or chemiluminescence intensity. In various aspects, the combustion system may be a turbulent lifted jet flame combustor, dump combustor, bluff-body stabilized combustor, or swirl burner.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 5A-B illustrates the construction of complex network from time series based on visibility condition.

FIG. 6A-B illustrates the construction of complex network from time series based on horizontal visibility condition.

FIG. 7A-B illustrates the construction of complex network from time series based on threshold grouping graph.

FIG. 8A-B shows complex networks of periodic time series based on visibility and horizontal visibility conditions, respectively.

Referring to the drawings, like numbers indicate like parts throughout the views.

DETAILED DESCRIPTION

Figure 1:
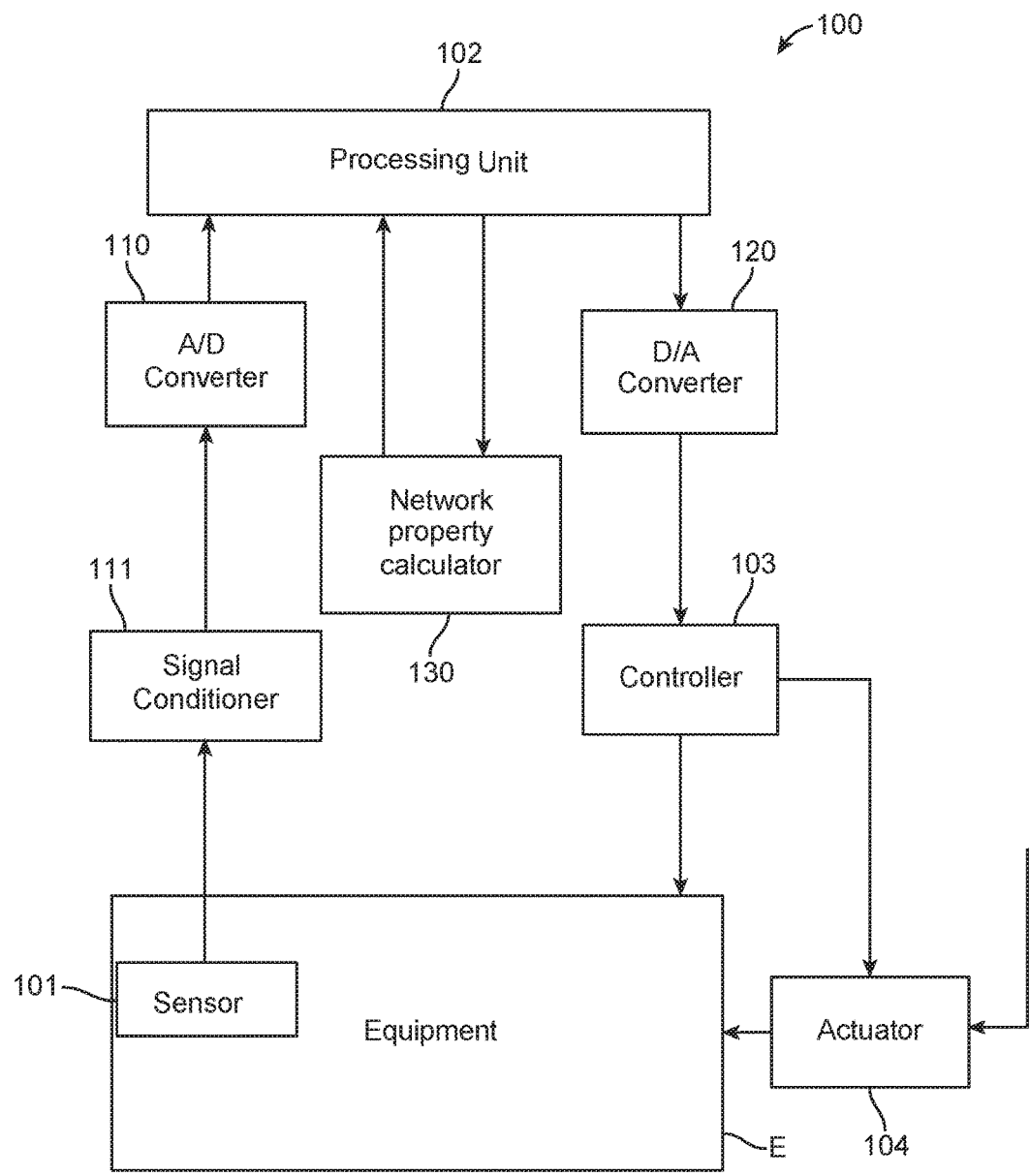
FIG. 1 shows a system for detecting the state of the system and impending oscillatory instabilities or transition according to one embodiment of the invention.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of in includes "in" and "on." Referring to the drawings, like numbers indicate like parts throughout the views. Additionally, a reference to the singular includes a reference to the plural unless otherwise stated or inconsistent with the disclosure herein.

Present disclosure relates to systems, devices, and methods for early prediction of events such as impending transition or instability in realms characterized by time series data relating to their operation, is further described with reference to the sequentially numbered figures. In some aspects, transitions referred to herein include the onset of oscillatory instabilities, for example, in one embodiment, a system can detect instability in systems such as aircraft engines, land-based gas turbines, burners, rocket motors, other propulsion and power generating systems. The transitions also include phenomena such as flame blowout in a combustor, where the system cannot return to its original state once the transition happens; such transitions are called absorbing transitions.

In some aspects, the time series data is analyzed using complex networks to derive indications relating to the state of the realms therefrom. The state of the realm may be a stable state, an unstable state or a transition state. The complex networks are envisaged as graphs or networks with non-trivial topological features used to characterize the state of the realms in ways not possible using simple functional models. The invention is directed toward detecting the state of the realm or the proximity to transition or instability during operation of practical devices such as combustion systems or aeromechanical devices such as aero-engine, a rocket motor or other propulsion system, a heat exchanger, gas transport systems, turbines including gas turbines or wind turbines, compressors or any other dynamic system for their safe operation, operating in an environment with turbulent flow.

Figure 2:
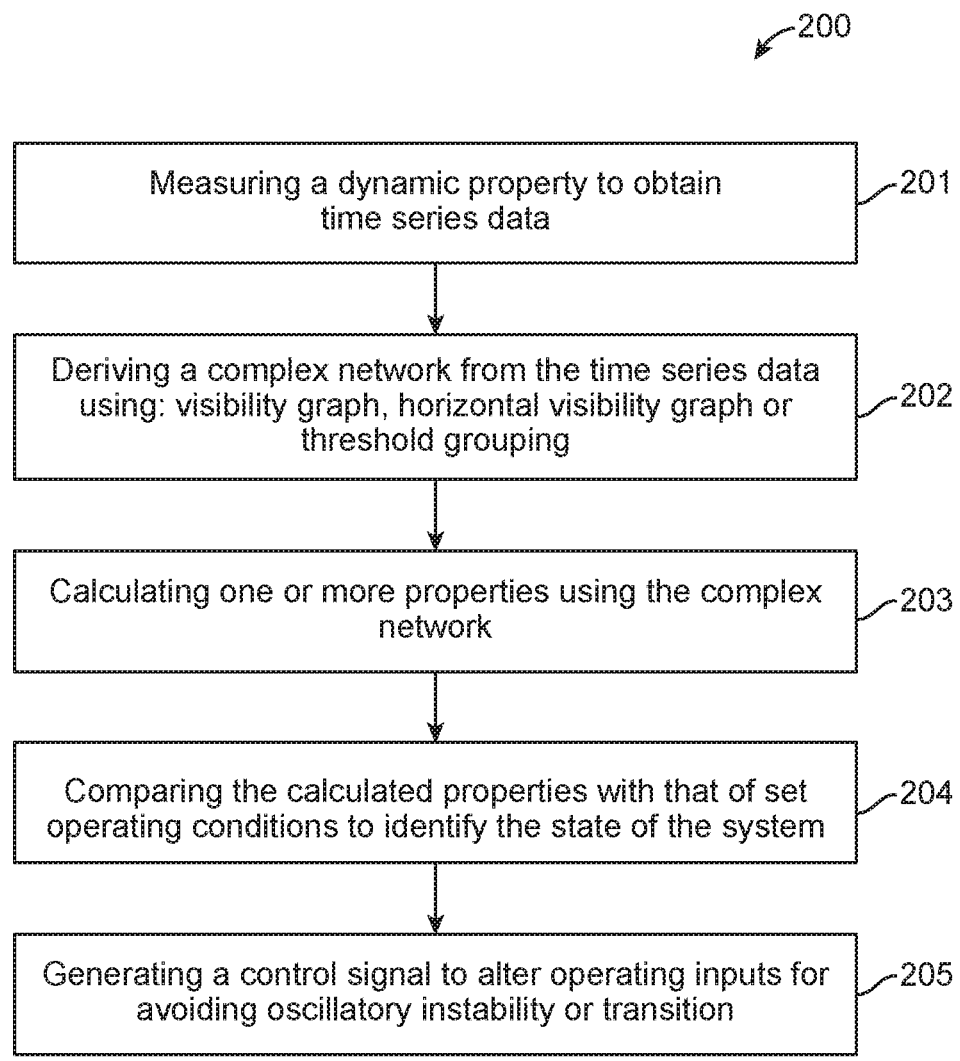
FIG. 2 illustrates a method for identifying the state of a system characterized by time series data relating to its operation in one embodiment.

The embodiments disclosed herein relate generally to devices, systems and methods for detecting and providing early warning of an event such as the onset of an impending instability or transition in combustion systems to ensure stable operating conditions. In some embodiments of the system and method as shown in FIGS. 1 and 2, the transitions may include the onset of transitions in practical devices such as combustion or aeromechanical devices. In some embodiments the transitions could be onset of flame blowout or onset of oscillatory instability such as thermoacoustic instability in combustion systems. In other embodiments, the transitions could be onset of aeroacoustic instability in gas transport system or aeroelastic instability such as flutter or oscillatory instabilities in aeromechanical devices such as compressors.

In one embodiment, the system 100 includes a measuring unit comprising sensors 101 attached to equipment E for measuring one or more variables representing the dynamics of operation of the equipment E to derive time series data. The system further includes a processing unit 102 with a computer with a processor, memory and signal conditioning circuitry for processing the time series data from sensors 101. In various embodiments, the time series data is processed to derive a complex network. The complex network is generated from the time series data using any of several methods such as visibility graph, horizontal visibility graph or threshold grouping, or any other method. In some embodiments, the system may further comprise a signal conditioner 111 and an A/D converter 110 to process the sensor signal being sent to the processing unit 102.

The system further includes a controller 103, for changing an operating input via a device 104 such as an actuator or a valve, for example to restore stable operation of the system, if instability or a transition is detected based on analysis of the complex network by calculating network properties indicative of the instability or transition. In some embodiments, the system may also comprise a D/A converter 120 attached to the processing unit 102 for processing the control signal. In some embodiments, the unit 102 may be implemented as hardware directly, instead of using a separate computer. In some embodiments, the network properties are calculated online for the present operating conditions of the system by network property calculator 130, which may be a dedicated calculating device with embedded instructions, for example.

In one aspect, a method 200 for predicting the operational state of equipment involving turbulent systems characterized by time series data relating to its operation is illustrated in FIG. 2. The method in one embodiment includes measuring a dynamic property relating to operation of equipment E according to step 201, as measured by a sensor 101 (FIG. 1). The dynamic property may be measured as time series data during operation of the equipment E. In the next step 202, the time series data is used to derive a complex network, by execution of instructions in the processing unit 102 (FIG. 1). In step 202, the complex network may be derived using any of several methods such as visibility graph, horizontal visibility graph, threshold grouping, etc. The method further involves in step 203, calculation of network properties relating to a state of operation from the complex network, using the processing unit 102. In some embodiments, the calculated network properties may include degree of a node, clustering coefficient of a node, average clustering coefficient, shortest path length, characteristic path length, global efficiency or any other network properties. In the next step 204 of the method, the calculated network properties are compared with that of normal operating conditions to identify the state of the system.

In various embodiments, the state of the system identified may be stable or unstable or transitory. In one embodiment, a transitory state is identified to predict the onset of an unstable state. In one embodiment, the system may be a combustion system and the state of the system may be stable combustion, an unstable state, such as an oscillatory instability state and a transition state. In one embodiment, the transition state may indicate onset of a flame blowout condition. The method may further include the step of generating a control or a warning signal, if unstable or transition state of the system is identified. On detecting the onset of a instability or transition, the processing unit 102 communicates a control signal to the controller 103 to alter one or more operating inputs via device 104 (FIG. 1). The control signal may alter the operating inputs of the system for maintaining the stability of the system 100 (FIG. 1.). In some embodiments, the system may be a combustion system and the operating inputs may be altered by device 104, such as a valve or actuator. The operating inputs altered may include air or fuel flow rates, degree of premixing of air and fuel, preheat temperature of air or fuel, or other flow or combustion inputs to mitigate an oscillatory instability or a flame blowout condition.

In various embodiments, the system 100 may be an aircraft engine, a land-based gas turbine, a burner or other combustion system, a rocket motor or other propulsion system, a heat exchanger, an aero engine, gas transport systems, turbines including those in gas turbines or wind turbines, compressors, or any other device where oscillatory instability or transition may occur. In various embodiments the instability or transition of the system may include thermoacoustic instability, combustion instability, aero-elastic flutter, flow-induced vibration, magneto-hydrodynamic, aerodynamic, aeromechanical, aero-acoustic instability or impending flame blowout.

Figure 3:
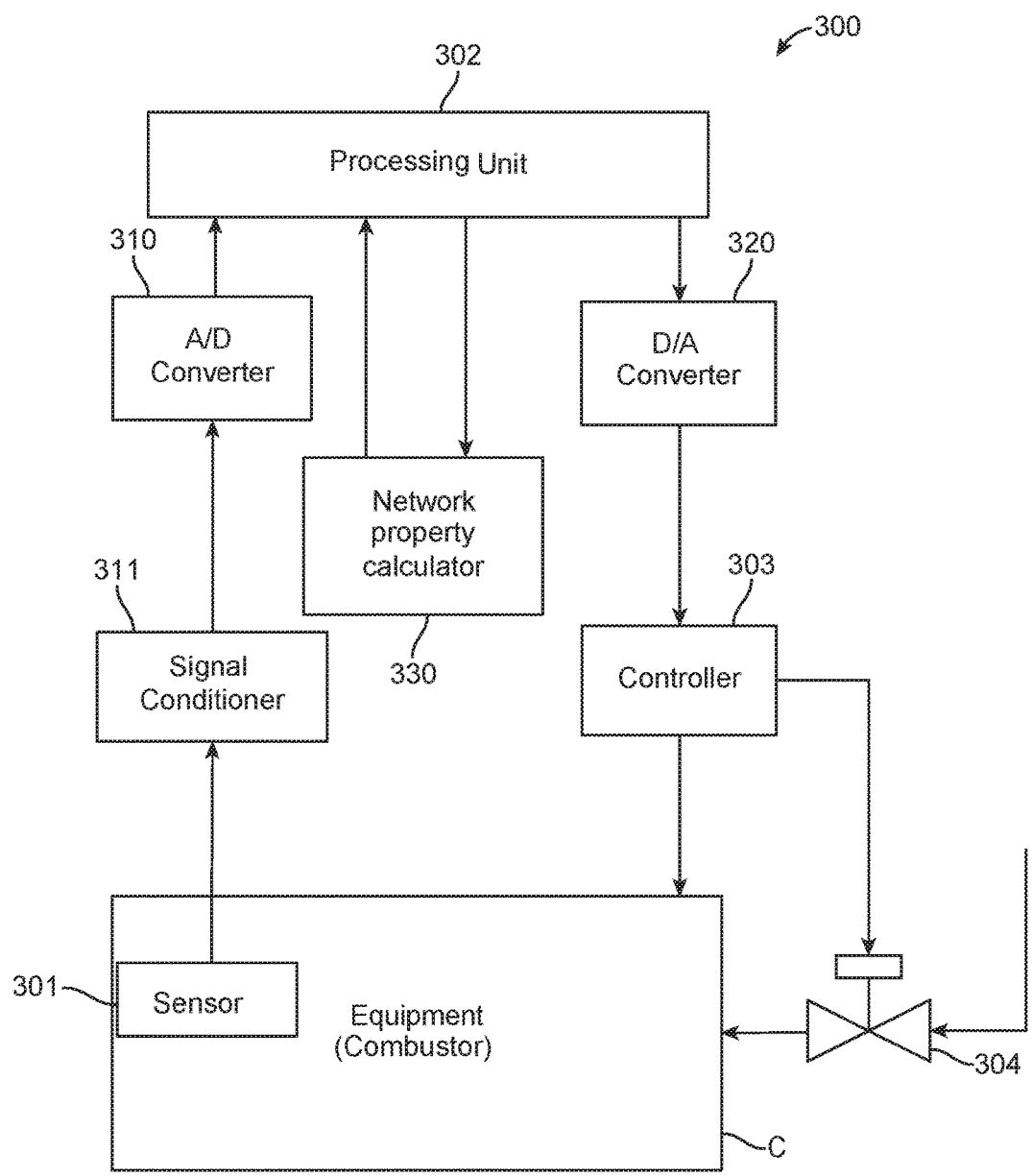
FIG. 3 illustrates a system for detecting flame blowout in a combustion system.
Figure 4:
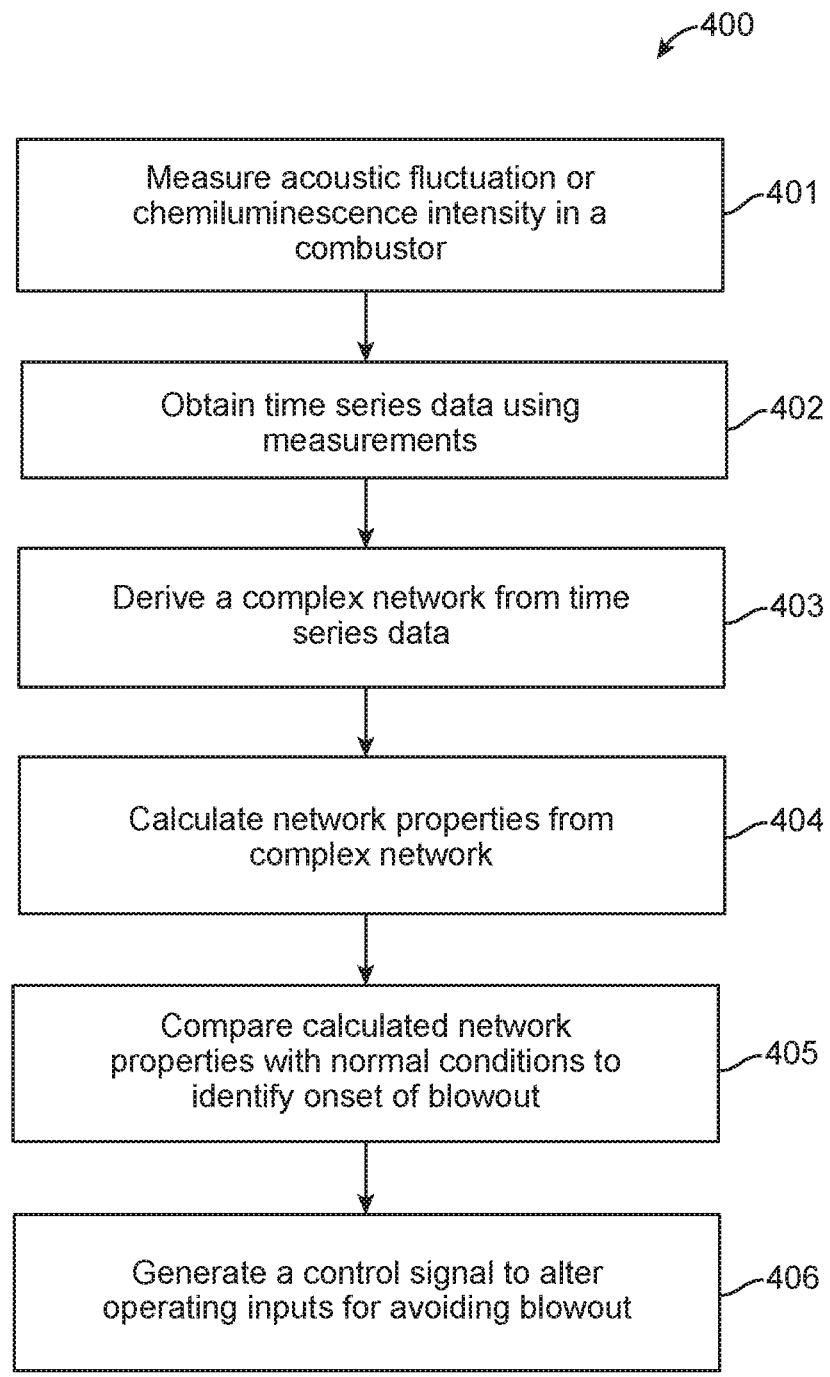
FIG. 4 illustrates a method for identifying the onset of flame blowout in combustion systems.

One embodiment of a system and method for identifying the onset of flame blowout in combustion systems is illustrated in FIGS. 3 and 4, respectively. The system 300 in one embodiment comprises a combustor C that is affixed with one or more sensors 301 for measuring operating variables within the combustor C. The sensor signals are sent to a processing unit 302, which receives the sensor signals for processing and is configured to send instructions to controller 303. Controller 303 is connected to at least one valve 304 for altering inputs to combustor S. In some embodiments the system 300 further comprises A/D converter 310 and signal conditioner 311 for processing the sensor signal before the signal enters processing unit 302. In one embodiment the downstream portion after the processing unit 302 may also comprise D/A converter 320, prior to the signal entering the controller 303. In various embodiments the sensor 301 could be one or more of acoustic sensors for measuring acoustic fluctuations, or chemiluminescence sensors for measuring chemiluminescence intensity. In some embodiments, the network properties are calculated online for the present operating conditions of the system by network property calculator 330.

In various embodiments, the system 300 may be used to control the occurrence of instability or flame blowout of a combustor S by varying the air flow rate, fuel flow rate or both. In some embodiments, the system may be a combustion system and the operating inputs may be altered by valve or actuator or any other device 304. The operating inputs altered may include air or fuel flow rates, degree of premixing of air and fuel, preheat temperature of air or fuel, or other flow or combustion inputs to mitigate an oscillatory instability or a flame blowout condition. Altering the operating inputs may include in addition to varying air or fuel flow rates for example, partially premixing the fuel and air to various degrees or fully premixing before feeding to combustor, and varying the preheating temperature of air or fuel or both, or altering the flame length.

In one aspect, the present disclosure discloses a method 400 for identifying the onset of impending transition include the onset of an impending flame blowout in aircraft engine, a land-based gas turbine, a burner or other combustion system, a rocket motor or other propulsion system, a heat exchanger, gas transport systems as illustrated in FIG. 4. The method in various aspects comprises measuring variables within the combustor C using sensors, such as sensors 301 as shown in FIG. 3. The variables could be acoustic fluctuation, chemiluminescence intensity or any other dynamic state variable of the combustion system according to step 401. In one embodiment, the measurements are used by processor 302 (FIG. 3) to generate time series data in step 402. The method further comprises processing the measured time series data to derive a complex network in step 403, from the measured time series data. In various embodiments, the complex network may be derived using methods such as visibility graph, horizontal visibility graph or threshold grouping of the data or any other method of deriving complex networks from time series data. In one embodiment, the processing of the time series data in step 403 may be done after signal conditioning and A/D conversion of the measured data.

In the next step 404, one or more network properties are calculated from the complex network. In some embodiments, the network properties calculated may include degree of a node, clustering coefficient of a node, average clustering coefficient, shortest path length, characteristic path length or global efficiency. The method further comprises in step 405, comparing the calculated network properties with that of normal operating conditions to identify transition to flame blowout in the system. The method in step 406 comprises in some embodiments, generating a control or a warning signal, if onset of impending transition to flame blowout is identified. In various embodiments, the control signal to prevent the impending transition to flame blowout may alter one or more operating inputs to the combustor, including air or fuel flow rates or premixing or partial premixing or preheat temperature or other flow or combustion inputs. The controller 303 (FIG. 3) may send a signal to valve 304 to alter the appropriate inputs to combustor S.

In some embodiments, when the complex network is generated using visibility and horizontal visibility graph methods in step 405, the value of the network properties clustering coefficient or global efficiency increase to a positive value from zero to signify impending transition to flame blowout. In one embodiment, when the complex network is generated using threshold grouping in step 405, the value of clustering coefficient drops below a particular threshold to signify impending transition to flame blowout.

While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope. Any other method of constructing a complex network from a time series and any other network property used in the manner illustrated, also fall within the scope of the invention as further illustrated with reference to the examples below. The system and method presented in the invention is illustrated with two systems namely bluff body stabilized combustor with turbulent flow and aero-acoustic systems involving pipe tone. However, the method can be used in identifying the stability margins of operation for any combustor or aero-acoustic/aero-elastic or aeromechanical systems. The threshold of allowable variation in the operating conditions can be provided by an operator. However, the examples are not to be construed as limiting the scope of the invention as defined by the appended claims.

EXAMPLES

Example—1: Complex Networks

A complex network comprises nodes and connections between nodes. The connections between the nodes are formed based on conditions such as visibility of nodes, recurrence of nodes and correlation of pseudo-periodic cycles etc. Any of these methods can be used to construct a complex network from a time series. In the present work, results were obtained using the filtered visibility graph, filtered horizontal visibility graph and threshold grouping algorithm. However, the invention is not confined to the above methods. Any other method for constructing a complex network from a time series is also within the scope of the invention.

In one aspect, a new time series was constructed by considering only the peaks in the time series data. The data points in the new time series are represented as vertical bars. Let x(t) be the acoustic pressure time series and p(t) be the vector that consists of data points belonging to crest of each cycle in the time series. Each data point in the vector p(t) is considered as a node. The information about the connectivity between nodes is defined in the adjacency matrix $A_{i+j}$. The criterion to make connection between nodes using visibility graph, horizontal visibility graph and threshold grouping can be described as follows. To avoid self-connections, $A_{i,j}$ is chosen as 0 in all the three methods.

Visibility Graph

According to the visibility condition, each data bar or data value in the time series is considered as a node and any two nodes are connected when a straight line can be drawn between these two nodes without intersecting any intermediate data bars. In the visibility graph, connections from a given node to any other nodes are made based on the visibility of other nodes from the top of the given node as shown in FIGS. 5A and 5B. In order to account for the experimental noise in the time series, a visibility graph with threshold of may also be used. The threshold f is specified as e times the mean value of the data points in the time series.

The visibility graph to convert a time series into a complex network is illustrated in FIGS. 5A and 5B. In FIG. 5A, time series to be converted into a complex network is represented as vertical bars. Each data point in the time series is converted into a node appearing as a black dot in FIG. 5B. If a straight line can be drawn between any two nodes (i.e. data heights i and j) without intersecting any nodes (i<k<j) between them, nodes i and j are connected. If two nodes are connected, a line is drawn between them in the network shown in FIG. 5B. The complex network with nodes and connections derived using the visibility condition for the time series shown in FIG. 5B.

Two nodes (i and j) are connected if the intermediate nodes (i<k<j) satisfy the following condition, $$\text{if } p_k + f < p_i + (p_i - p_j)\frac{t_k - t_i}{t_i - t_j}, \quad A_{i,j} = 1; \quad \text{Equation 1}$$

$$\text{else}, \quad A_{i,j} = 0;$$

$$\text{where,} \quad f = e * \text{mean}(p)$$

Horizontal Visibility Graph

The horizontal visibility graph is a special case of visibility graph where the connection from a node to any other node is made based on the horizontal visibility between these nodes. If a horizontal line can be drawn between the two nodes without intersecting any node between them, the nodes are treated as connected. The concept of horizontal visibility is shown in FIG. 6A and FIG. 6B. Two nodes (i and j) are connected if the intermediate nodes (i<k<j) satisfy the following condition, $$\text{if, } p_i, p_j > p_k + f, A_{i,j} = 1 \quad \text{Equation 2}$$

else, $A_{i,j}$=0;

where, f=e*mean(p)

f is the threshold, which is specified as e times the mean value of the data points in the time series.

The horizontal visibility graph to convert a time series into a complex network illustrated in FIGS. 6A and 6B. In FIG. 6A, time series to be converted into a complex network is represented as vertical bars. Each data point in the time series is converted into a node appearing as a black dot in FIG. 6B. Horizontal visibility graph is a special case of visibility graph. If a horizontal line can be drawn between any two nodes (i and j) without intersecting any nodes (i<k<j) between them, nodes i and j are connected with a line. The complex network derived using the horizontal visibility condition for the time series shown in FIG. 6B.

Threshold Grouping Algorithm

In addition to the above methods, we propose a new method for constructing complex networks from a time series. In the threshold grouping method, each data bar or data value in the time series is treated as a node. If the difference between the values of two data points is less than a threshold ε, they are connected. Any two nodes with a difference more than ε are not connected. Nodes that are not connected to their neighbors are treated as not connected to other nodes also. For i and j to be connected, the values of i, j and k (i<k<j, k denotes the points between i and j) should have approximately same value for all values of k. The condition is mathematically given as, $$\text{if } |p_i-p_j|, |p_i-p_k|, |p_k-p_j| < \varepsilon, A_{i,j}=1; \quad \text{Equation 3}$$

else, $A_{i,j}=0$;

The threshold grouping method to convert a time series into a complex network is shown in FIG. 7A-B. Time series to be converted into a complex network is represented as vertical bars in FIG. 7A. Each data point is converted into nodes. For node i and j to be connected, the values of i,j and k (i<k<j, k denotes all the points between and j) should have approximately the same value. The complex network derived using the threshold grouping method for the time series shown in FIG. 7B.

The method is represented in FIG. 7A-B. The taller data points are connected to their taller neighbors and shorter data points are connected with their shorter neighbors. The taller data points separated by shorter data points are not connected with each other.

Example—2: Properties of a Complex Network

Some of the network properties are calculated from the adjacency matrix obtained from the three methods and are useful in characterizing the structure or topology of the complex networks. The commonly used network properties are, Degree of a Node ($K_0$)

$$K_v = \sum_{i=1}^{N} A_{v,i} \quad \text{Equation 4}$$

$K_v$ represents total number of connections of each node v.

Clustering Coefficient of a Node ($C_v$)

$$C_v = \frac{2N_v}{K_v(K_v - 1)} \quad \text{Equation 5}$$

where $N_v$ is the number of connections in the neighborhood of node v and $k_v(k_v-1)/2$ represents the maximum number of possible connections in the neighborhood of node v. $C_v$ is the measure of how well the nodes are connected within the network. For example, consider a node connected to two other nodes. The maximum possible number of connections in the neighborhood of a given node is 1. If two other nodes are connected with each other, then the clustering coefficient attains its maximum value of 1. The value of 1 for the clustering coefficient for any node implies that all the nodes in the neighborhood of a given node are connected to each other.

Average Clustering Coefficient (C)

$$C = \frac{1}{N} \sum_{v=1}^{N} C_v \quad \text{Equation 6}$$

where C is the average of clustering coefficients for all the nodes. It represents the clustering coefficient of the network.

Shortest Path Length ($L_{i,j}$)

Node i and node j can be connected in a number of ways. $L_{i,j}$ is the number of connections required in the shortest path between i and j. For example, if node and node j are directly connected, then $L_{i,j}=1$. For a disconnected node, $L_{i,j}=\infty$.

Characteristic Path Length (L)

$$L = \frac{1}{N(N-1)} \sum_{i=1}^{N} \sum_{j=1}^{N} L_{i,j} \quad \text{Equation 7}$$

The characteristic path length is the sum of all the shortest paths divided by the maximum possible number of connections in the network.

Global Efficiency (E)

$$E = \frac{1}{N(N-1)} \sum_{i=1}^{N} \sum_{j=1}^{N} \frac{1}{L_{i,j}} \quad \text{Equation 8}$$

Global efficiency is useful for networks with disconnected nodes.

Example—3: Illustration of Derived Complex Network

Illustration of complex network derived using visibility and horizontal visibility graph from a periodic time series (FIG. 8A-B).

For a period-1 time series, both visibility (straight line) and horizontal visibility condition (horizontal line) are identical. Peaks in the periodic time series are considered as nodes. All the nodes are of the same height and have visibility only with its neighbors. As an example, the neighborhood of a node 2 is node 1 and node 3 (since node 2 is connected only with node 1 and node 3). Here, node 1 and node 3 are not directly connected. So, the number of edges available in the neighborhood of a node 2 is zero. The clustering coefficient of a node 2 is zero. Here, all the nodes are connected only with its neighbors. The clustering coefficient of all the nodes becomes zero. The clustering coefficient of the complex network (average of clustering coefficient of all the nodes) is also zero.

Figure 9:
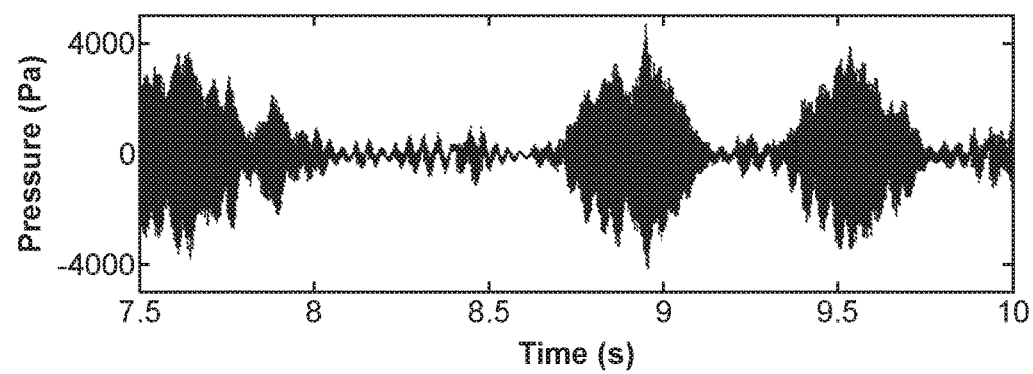
FIG. 9 illustrates pressure time series data acquired before the onset of flame blowout for a time interval.

Pressure time series data acquired before the onset of flame blowout is shown for a small time interval shown in FIG. 9. The pressure time series involves the bursts of large-amplitude periodic oscillations amidst regions of low-amplitude chaotic fluctuations during this state.

Example—4: Variation of Network Properties to an Impending Flame Blowout in the Combustion System The complex networks are derived from pressure time series data using visibility condition given in equation (1). Variation of the normalized clustering coefficient $C/C_0$ from visibility graph for varying parameter illustrated in FIG. 10. Note that there are high amplitude thermoacoustic oscillations appearing in combustion systems. According to visibility graph, the clustering coefficient of network during periodic oscillations (instability) is zero. The rise in $C/C_0$ from the value of zero is the precursor to an impending flame blowout. Variation of the normalized clustering coefficient $C/C_0$ from horizontal visibility graph for varying parameter shown in FIG. 10. Note that there are high amplitude thermoacoustic oscillations appearing in the combustion systems. Horizontal visibility graph is a special case of visibility graph. Here also a rise in the value of $C/C_0$ from zeros is the indication to the onset of an impending flame blowout.

Figure 10:
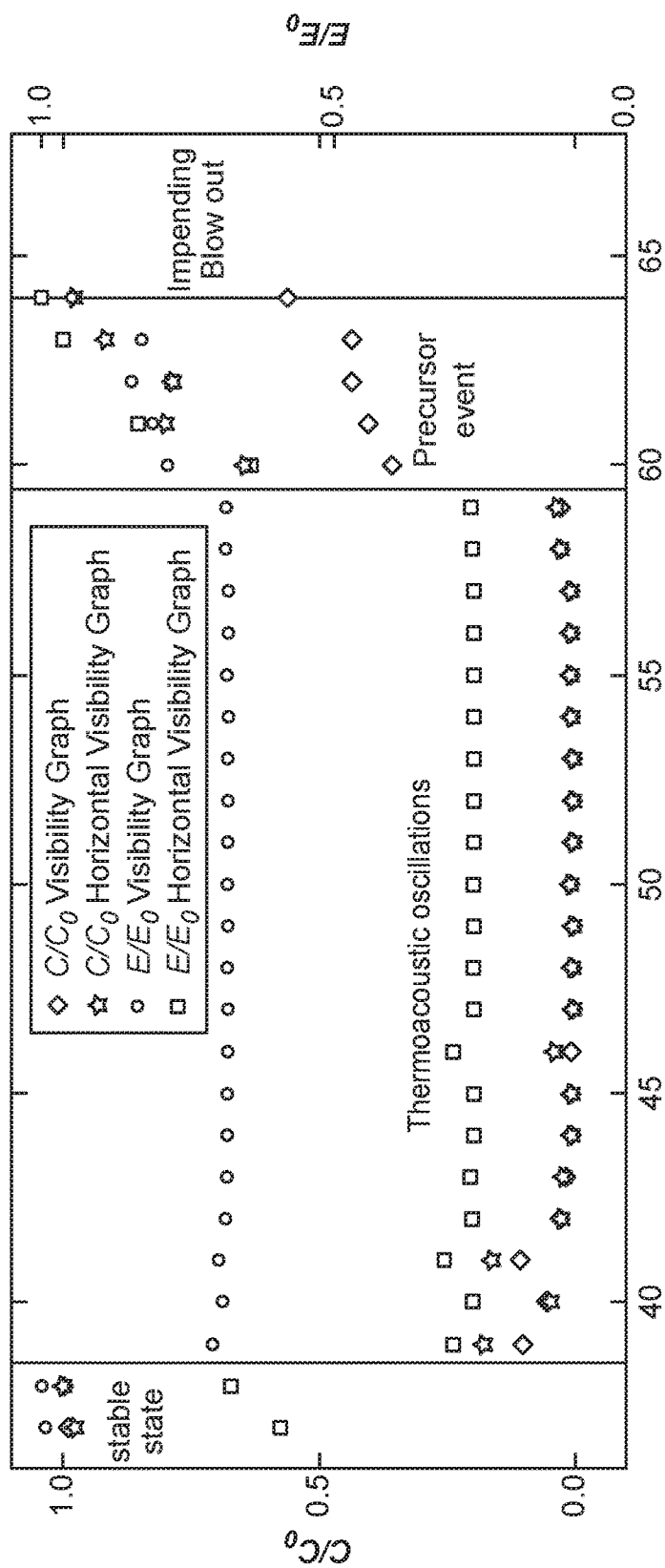
FIG. 10 shows variation of the normalized clustering coefficient $C/C_0$ and normalized global efficiency $E/E_0$ from visibility graph and horizontal visibility graph, respectively, for varying values of the parameter during the transition to flame blowout via thermoacoustic oscillations.

Variation of the normalized global efficiency $E/E_0$ from visibility graph for varying parameter shown in FIG. 10. Note that there are high amplitude thermoacoustic oscillations appearing in combustion systems. The value of the global efficiency of the complex network during thermoacoustic oscillations is a minimum in the visibility graph. The rise in $E/E_0$ for a visibility graph is the precursor to an impending flame blowout. Variation of the normalized global efficiency $E/E_0$ from horizontal visibility graph for varying parameter shown in FIG. 10. Note that there are high amplitude thermoacoustic oscillations appearing in the combustion systems. Horizontal visibility graph is a special case of visibility graph. Here also, a rise in the value of $E/E_0$ is the indication to onset of an impending flame blowout.

Figure 11:
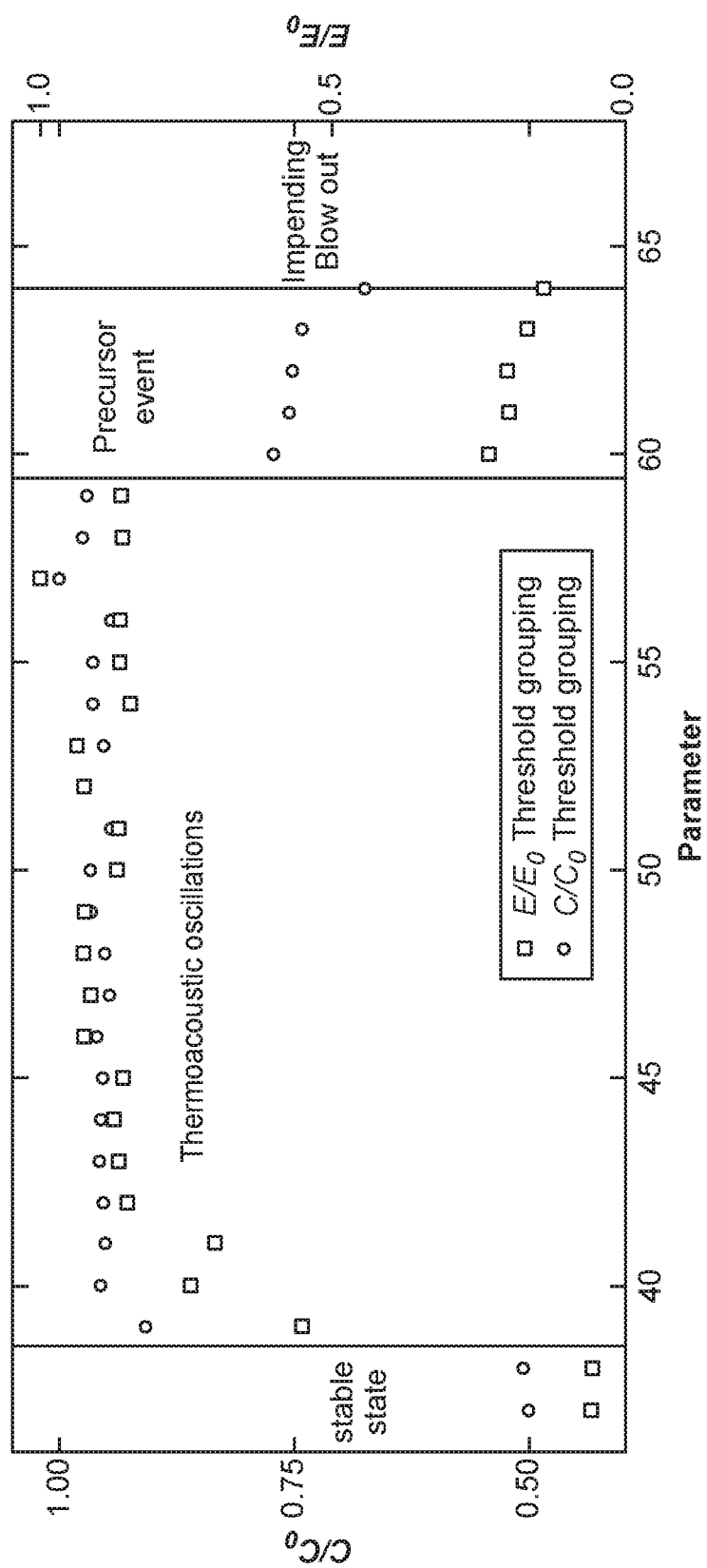
FIG. 11 shows variation of the normalized clustering coefficient $C/C_0$ and normalized global efficiency $E/E_0$, respectively, using threshold grouping method for varying values of the parameter during the transition to flame blowout via thermoacoustic oscillations.

Variation of the normalized clustering coefficient $C/C_0$ from threshold grouping method for varying parameter illustrated in FIG. 11. Note that there are high amplitude thermoacoustic oscillations appearing in the combustion systems. According to threshold grouping method, the periodic oscillations (thermoacoustic instability) are converted into complex network with clustering coefficient of one. Here, the drop in $C/C_0$ from one acts as a precursor to an impending flame blowout. Variation of the normalized global efficiency $E/E_0$ from threshold grouping method for varying parameter shown in FIG. 11. Note that there are high amplitude thermoacoustic oscillations appearing in the combustion systems. According to threshold grouping method, the periodic oscillations (thermoacoustic instability) are converted into complex network with clustering coefficient of one. Here, the drop in $E/E_0$ from a value of one acts as precursor to an impending flame blowout.

Figure 12:
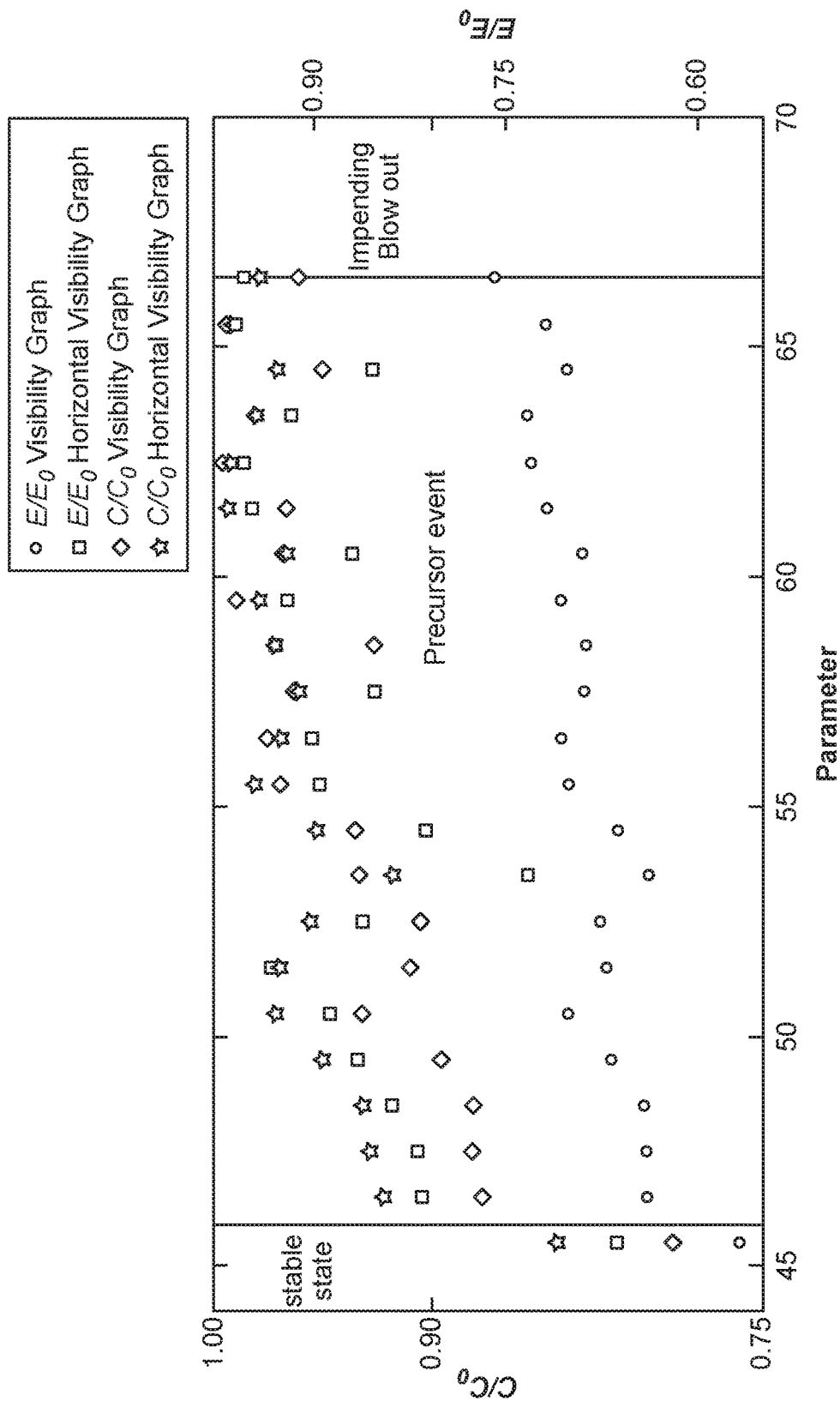
FIG. 12 shows variation of the normalized clustering coefficient $C/C_0$ and normalized global efficiency $E/E_0$ from visibility graph and horizontal visibility graph, respectively, for varying values of the parameter during the transition to flame blowout without thermoacoustic oscillations.

Variation of the normalized clustering coefficient $C/C_0$ from visibility graph for varying parameter is shown in FIG. 12. Note that there are no high amplitude thermoacoustic oscillations appearing in the combustion systems. The air flow rate (SLPM) is the control parameter. According to visibility graph, the value of $C/C_0$ raises in the transition to flame blowout, which is the precursor to an impending flame blowout. Variation of the normalized clustering coefficient $C/C_0$ from horizontal visibility graph for varying parameter is illustrated in FIG. 12. Note that there are no high amplitude thermoacoustic oscillations in the given parameter space. Horizontal visibility graph is a special case of visibility graph. Here also, the increase in the value of $C/C_0$ is the precursor to an impending flame blowout.

Variation of the normalized global efficiency $E/E_0$ from visibility graph for varying parameter is shown in FIG. 12. Here, there are no high amplitude thermoacoustic oscillations in this parameter space. The air flow rate (SLPM) is the control parameter. The value of $E/E_0$ increases in visibility graph, which acts as a precursor to an impending flame blowout. Variation of the normalized global efficiency $E/E_0$ from horizontal visibility graph for varying parameter is shown in FIG. 12. Note that there are no high amplitude thermoacoustic oscillations in this parameter space. Horizontal visibility graph is a special case of visibility graph. Here also, the increase in the value of $E/E_0$ is the precursor to an impending flame blowout.

Figure 13:
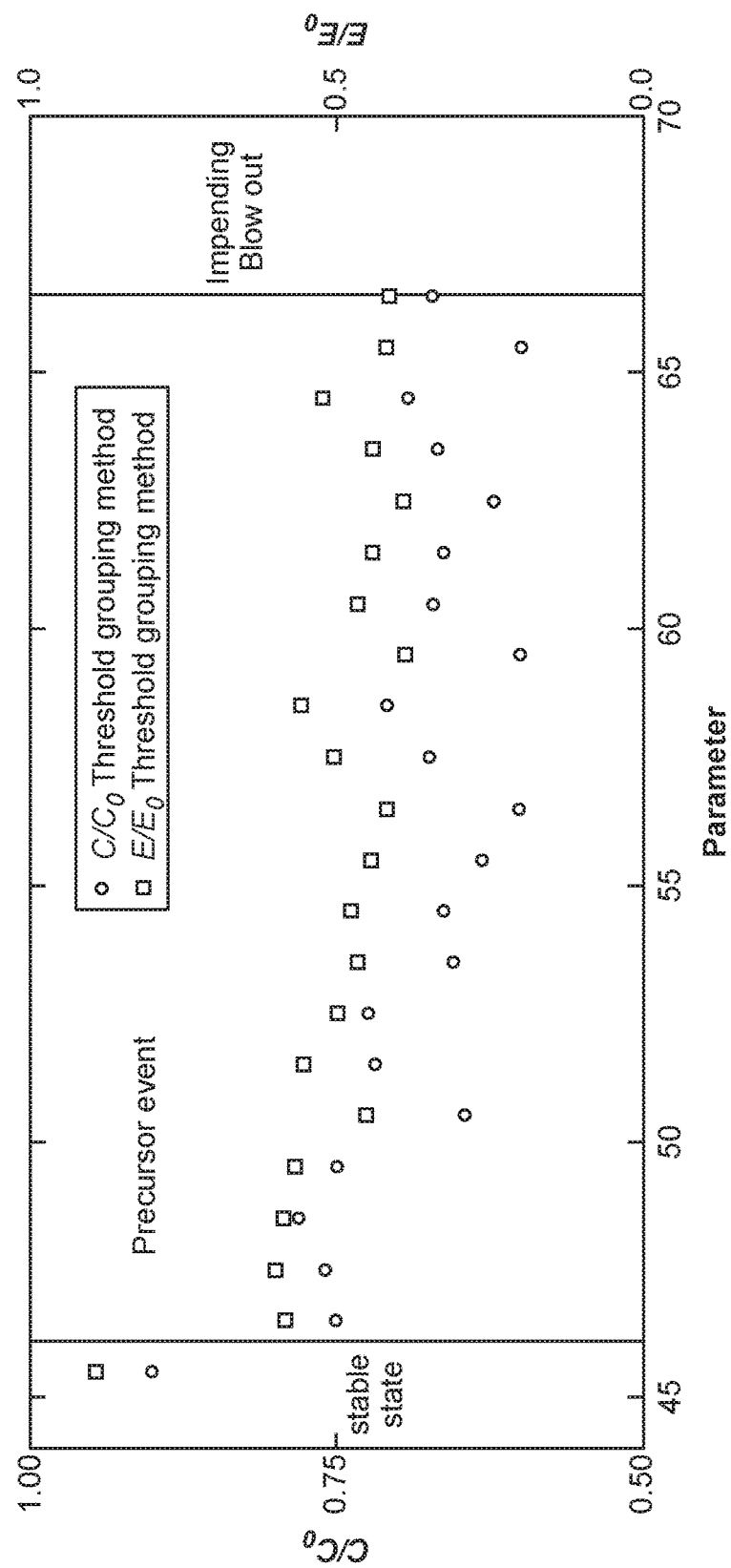
FIG. 13 shows variation of the normalized clustering coefficient $C/C_0$ and normalized global efficiency $E/E_0$, respectively, using threshold grouping method for varying values of the parameter during the transition to flame blowout without thermoacoustic oscillations.

Variation of the normalized clustering coefficient $C/C_0$ from threshold grouping method for varying parameter is shown in FIG. 13. Note that there is no high amplitude thermoacoustic oscillations appearing in this parameter space. According to the threshold grouping method, the value of clustering coefficient $C/C_0$ drops when the combustion system approaches flame blowout limit. Variation of the normalized global efficiency $E/E_0$ from threshold grouping method for varying parameter is illustrated in FIG. 13. Note that there are no high amplitude thermoacoustic oscillations appearing in this parameter space. According to threshold grouping method, the value of the global efficiency $E/E_0$ drops well before the onset of flame blowout.

Figure 14:
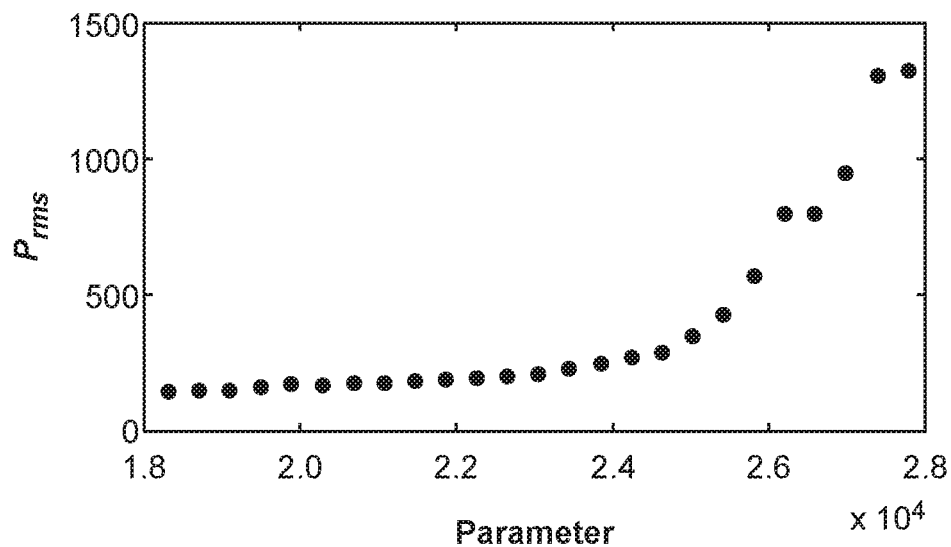
FIGS. 14 and FIG. 15 show variation of the root mean square value of the fluctuating pressure for varying parameter in a turbulent combustor and in an aero-acoustic system respectively.
Figure 15:
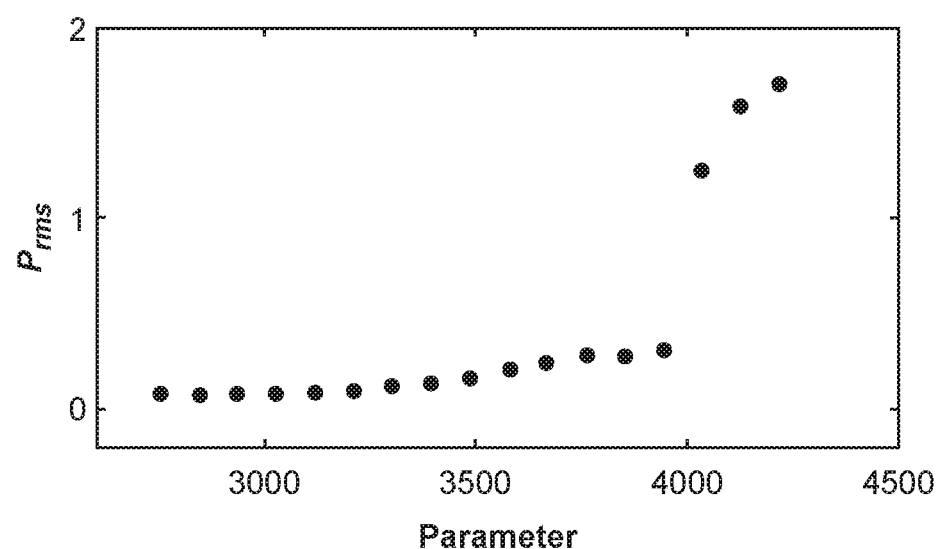

Example—5: Variation of Network Properties to an Impending Oscillatory Instability—Combustion Instability in a Combustion System and Aeroacoustic Instability in an Aeroacoustic System Variation of root mean square value of the acoustic pressure ($P_{rms}$) for varying control parameter in a turbulent combustor is illustrated in FIG. 14. Here, the control parameter is Reynolds number. The value of $P_{rms}$ begins to increase when Reynolds number is around 25000. Variation of root mean square value of the acoustic pressure ($P_{rms}$) for varying control parameter in an aeroacoustic system is illustrated in FIG. 15. Here, the control parameter is Reynolds number. The value of $P_{rms}$ begins to increase when Reynolds number is around 4000.

Figure 16:
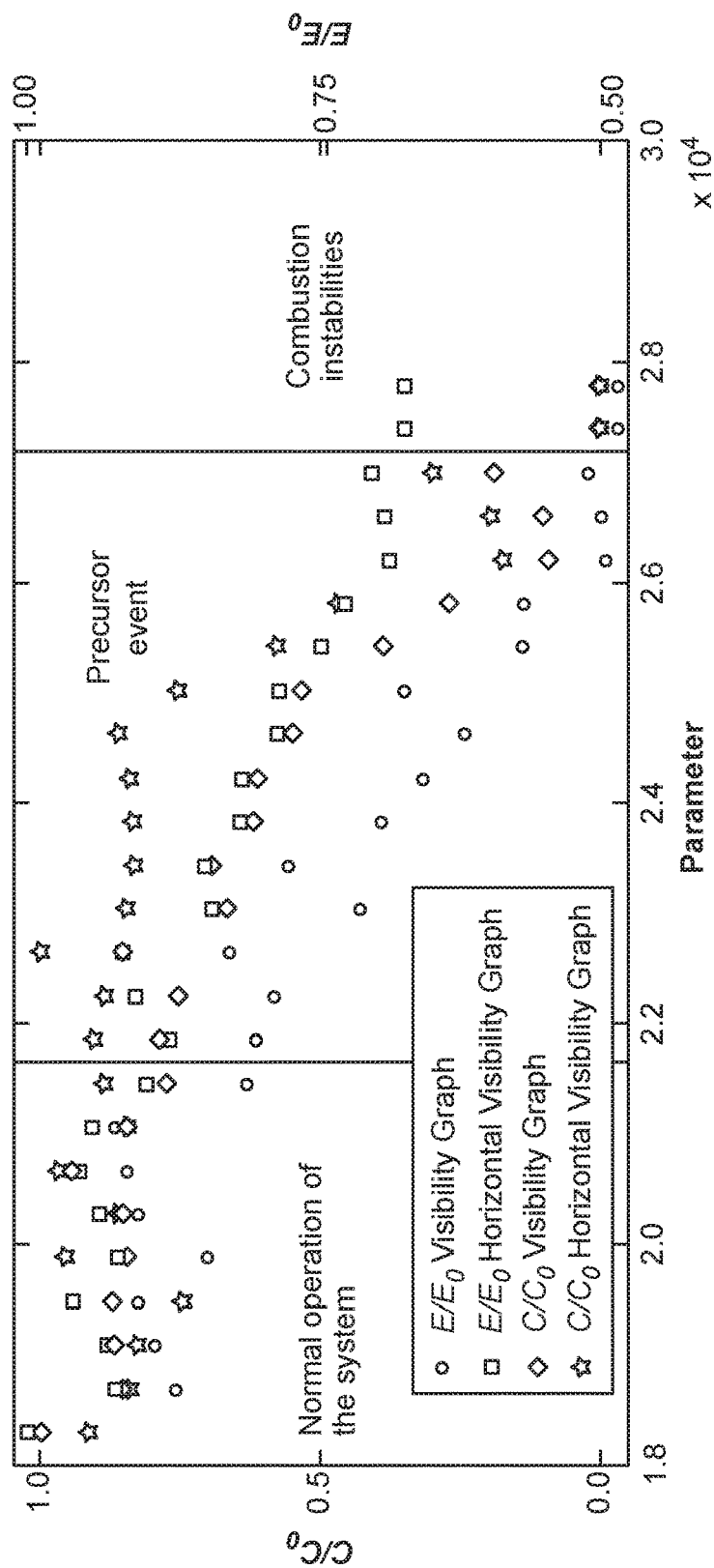
FIG. 16 shows variation of normalized clustering coefficient $C/C_0$ and normalized global efficiency $E/E_0$ from visibility graph and horizontal visibility graph, respectively, for varying parameter in a turbulent combustor.

Variation of the normalized clustering coefficient $C/C_0$ from visibility graph for varying parameter in a turbulent combustor is illustrated in FIG. 16. Note that combustion instability (also known as thermoacoustic instability) appearing in the combustion systems are characterized by periodic oscillations. According to visibility graph, the clustering coefficient of network during periodic oscillations (instability) is zero. However, the normal operation of the combustor is characterized by aperiodic oscillations. According to visibility condition, the normal operation of the system have positive clustering coefficient. The drop in $C/C_0$ from positive value to zero is the precursor to the impending combustion instabilities. Variation of the normalized clustering coefficient $C/C_0$ from horizontal visibility graph for varying parameter in a turbulent combustor shown in FIG. 16. Note that combustion instability appearing in the combustion systems are characterized by periodic oscillations. Horizontal visibility graph is a special case of visibility graph. Here also a drop in the value of $C/C_0$ to zeros is the indication to the onset of the impending combustion instabilities.

Variation of the normalized global efficiency $E/E_0$ from visibility graph for varying parameter in a turbulent combustor shown in FIG. 16. Note that combustion instability appearing in the combustion systems are characterized by periodic oscillations. The value of the global efficiency of the complex network during thermoacoustic oscillations is a minimum in the visibility graph. However, the normal operation of the combustor is characterized by aperiodic oscillations. According to visibility condition, the normal operation of the system has higher positive value of global efficiency. The drop in $E/E_0$ is the precursor to impending combustion instabilities (also known as thermoacoustic instability). Variation of the normalized global efficiency $E/E_0$ from horizontal visibility graph for varying parameter in a turbulent combustor shown in FIG. 16. Note that combustion instability appearing in the combustion systems are characterized by periodic oscillations. Horizontal visibility graph is a special case of visibility graph. Here also, a drop in the value of $E/E_0$ is the indication to onset of the impending combustion instabilities.

Figure 17:
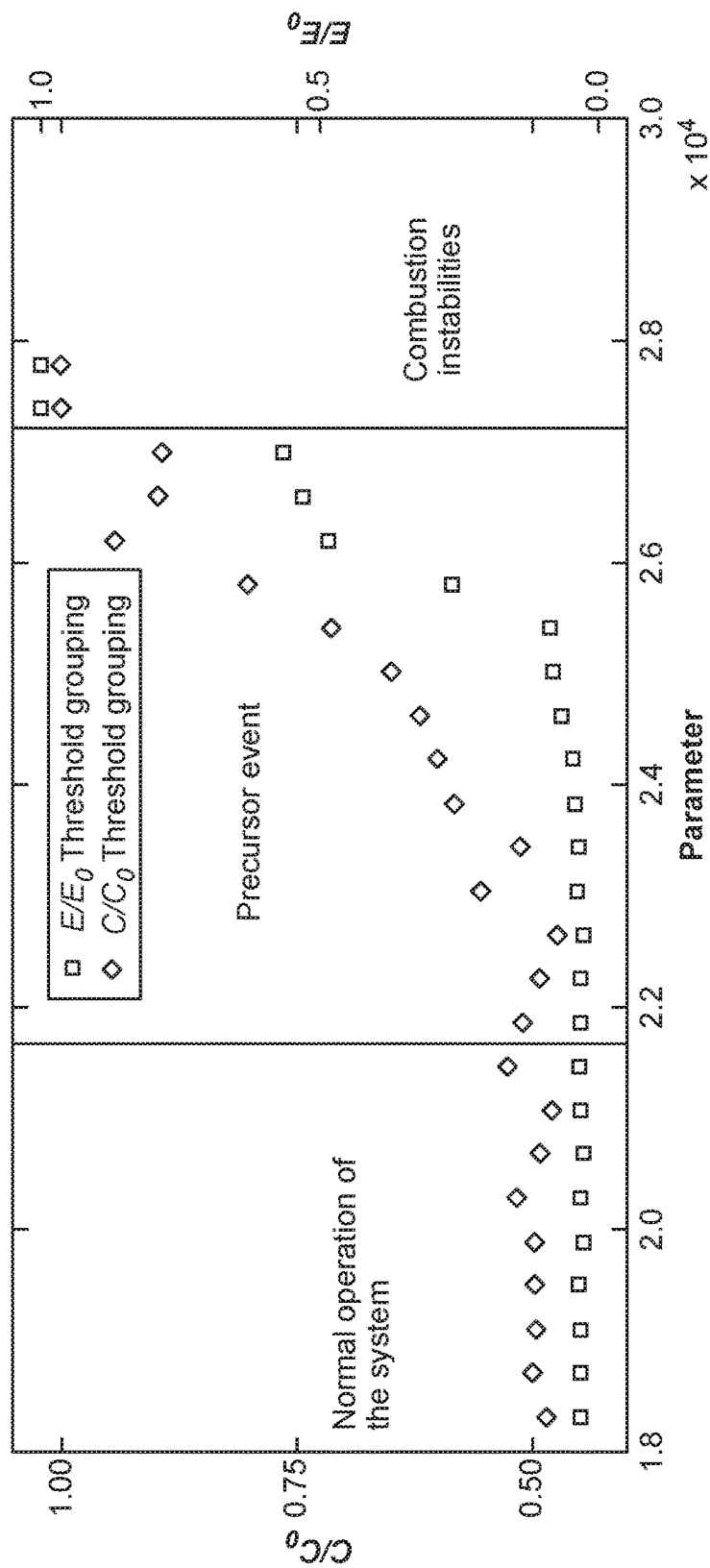
FIG. 17 shows variation of normalized clustering coefficient $C/C_0$ and normalized global efficiency $E/E_0$ respectively from threshold grouping method for varying parameter in a turbulent combustor.

Variation of the normalized clustering coefficient $C/C_0$ from threshold grouping method for varying parameter in a turbulent combustor illustrated in FIG. 17. Note that combustion instability appearing in the combustion systems are characterized by periodic oscillations. According to threshold grouping method, the periodic oscillations (thermoacoustic instability) are converted into complex network with clustering coefficient of one. However, the normal operation (i.e. stable operation) of the combustor is characterized by aperiodic oscillations. Here, the rise in $C/C_0$ to one acts as a precursor to an impending combustion instabilities (also known as thermoacoustic instability). Variation of the normalized global efficiency $E/E_0$ from threshold grouping method for varying parameter in a turbulent combustor is shown in FIG. 17. Note that combustion instability (also known as thermoacoustic instability) appearing in the combustion systems are characterized by periodic oscillations. According to threshold grouping method, the periodic oscillations (thermoacoustic instability) are converted into complex network with clustering coefficient of one. Here, the rise in $E/E_0$ from a low value to a value of one acts as precursor to an impending combustion instabilities.

Figure 18:
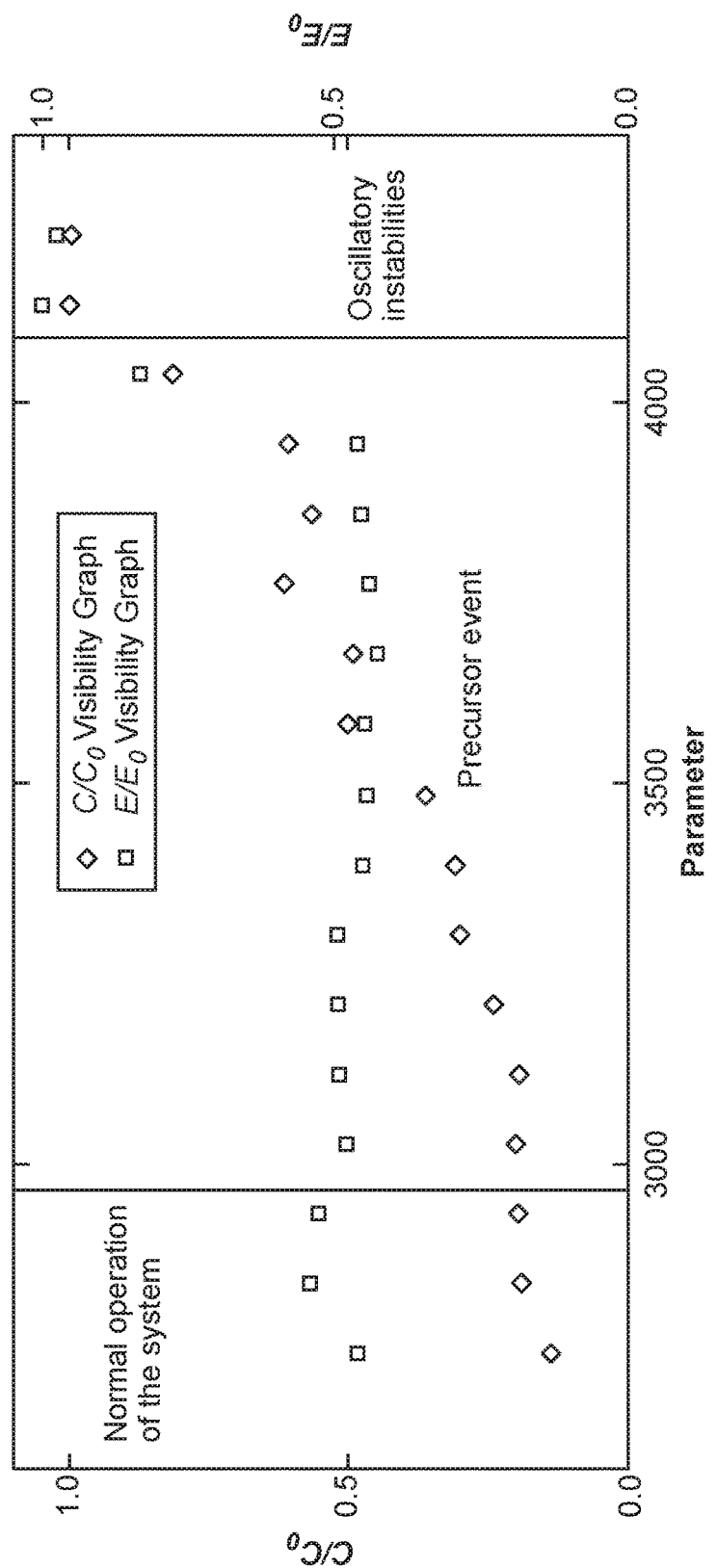
FIG. 18 shows variation of normalized clustering coefficient $C/C_0$ and normalized global efficiency $E/E_0$ from visibility graph respectively, for varying parameter in an aero-acoustic system.
Figure 19:
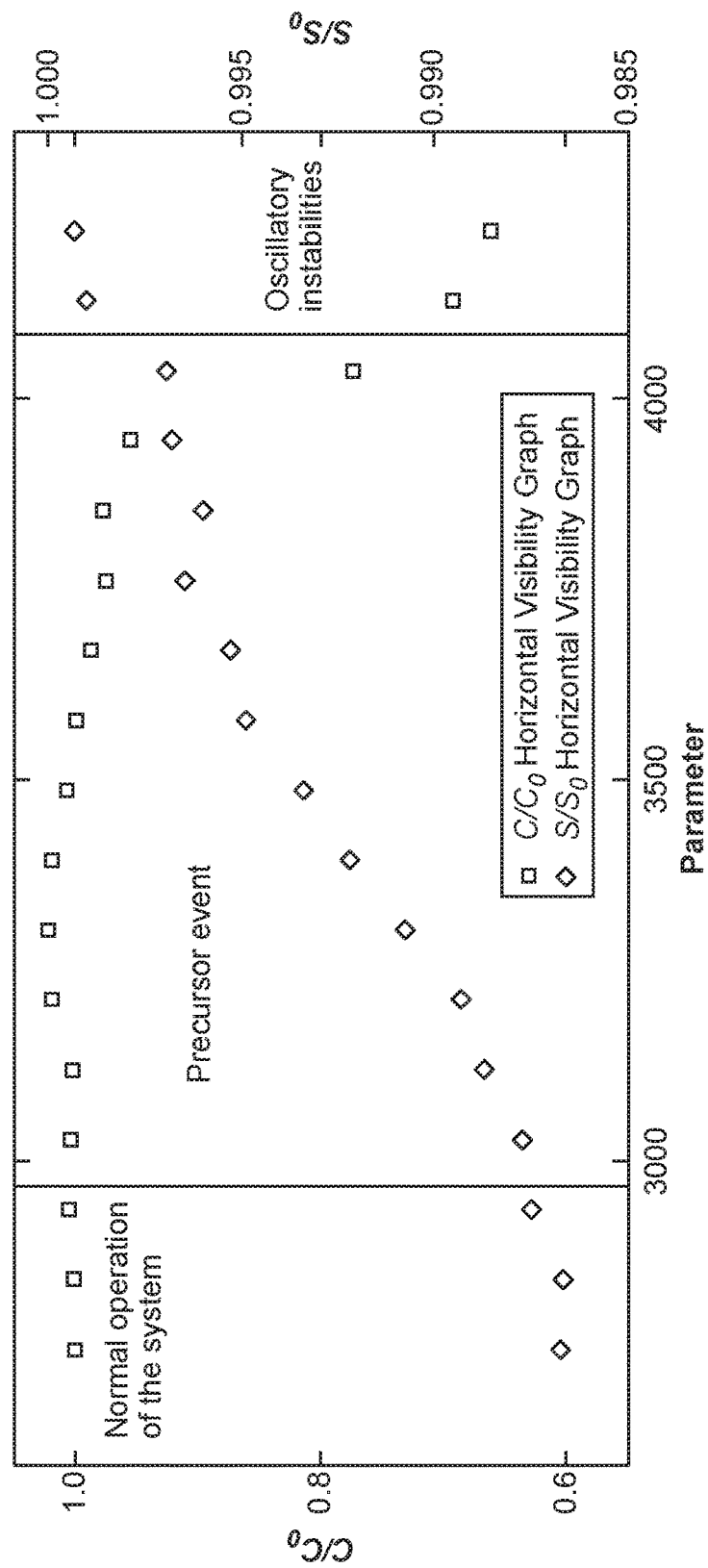
FIG. 19 shows variation of normalized clustering coefficient $C/C_0$ and normalized entropy $S/S_0$ from horizontal visibility graph, respectively, for varying parameter in an aero-acoustic system.

Variation of the normalized clustering coefficient $C/C_0$ from visibility graph for varying parameter in an aeroacoustic system illustrated in FIG. 18. Note that oscillatory instabilities appearing in the aeroacoustic systems are characterized by high-amplitude oscillations. However, the normal operation of the system is characterized by aperiodic oscillations. According to visibility condition, the rise in $C/C_0$ is the precursor to impending oscillatory instabilities in aeroacoustic systems. Variation of the normalized clustering coefficient $C/C_0$ from horizontal visibility graph for varying parameter in an aeroacoustic system shown in FIG. 19. Note that oscillatory instabilities appearing in the aeroacoustic systems are characterized by periodic oscillations. Horizontal visibility graph is a special case of visibility graph. Here also a rise in the value of $C/C_0$ from a low value towards a value of one is the indication to the onset of impending oscillatory instabilities in aeroacoustic systems.

Variation of the normalized global efficiency $E/E_0$ from visibility graph for varying parameter in an aeroacoustic system shown in FIG. 18. Note that oscillatory instabilities appearing in the aeroacoustic systems are characterized by high-amplitude oscillations. However, the normal operation of the combustor is characterized by aperiodic oscillations. According to visibility condition, the rise in $E/E_0$ is the precursor to impending oscillatory instabilities in aeroacoustic systems. Variation of the normalized entropy $S/S_0$ from horizontal visibility graph for varying parameter in an aeroacoustic system shown in FIG. 19. Note that oscillatory instabilities appearing in the aeroacoustic systems are characterized by periodic oscillations. Horizontal visibility graph is a special case of visibility graph. Here, a drop in the value of $S/S_0$ is the indication to onset of impending oscillatory instabilities in aeroacoustic systems.

Figure 20:
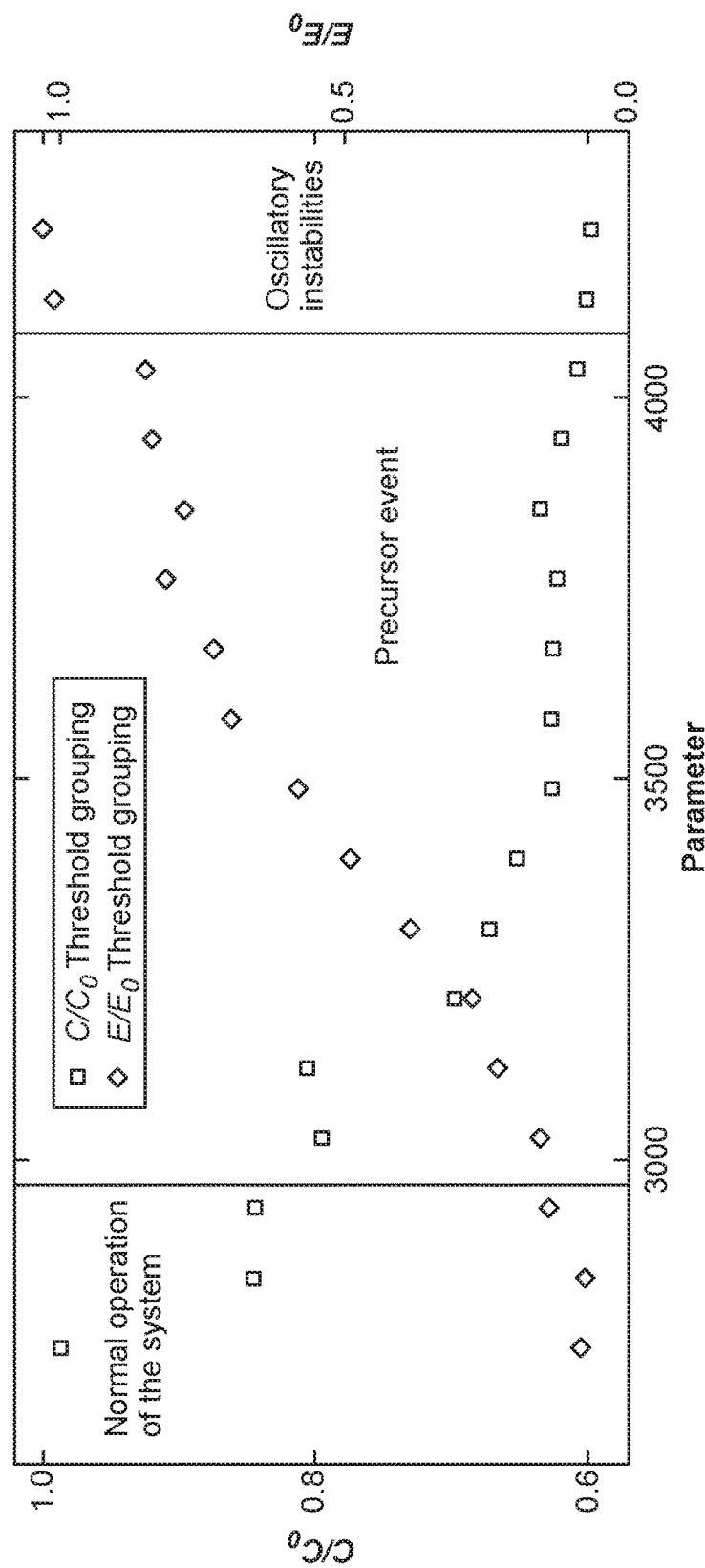
FIG. 20 show variation of normalized clustering coefficient $C/C_0$ and normalized global efficiency $E/E_0$ respectively from threshold grouping graph for varying parameter in an aero-acoustic system.

Variation of the normalized clustering coefficient $C/C_0$ from threshold grouping method for varying parameter in an aeroacoustic system illustrated in FIG. 20. Note that oscillatory instabilities appearing in the aeroacoustic systems are characterized by periodic oscillations. According to threshold grouping method, the periodic oscillations (instability) are converted into complex network with clustering coefficient of one. However, the normal operation of the combustor is characterized by aperiodic oscillations. Here, the rise in $C/C_0$ to one acts as a precursor to impending oscillatory instabilities in aeroacoustic systems. Variation of the normalized global efficiency $E/E_0$ from threshold grouping method for varying parameter in an aeroacoustic system shown in FIG. 20. Note that oscillatory instabilities appearing in the aeroacoustic systems are characterized by periodic oscillations. Here, the drop in $E/E_0$ from a value of one acts as precursor to impending oscillatory instabilities in aeroacoustic systems.

The network properties corresponding to the stable operating conditions are stored in the controller. The gradual change in such network properties are an indication of the onset of instability. The controller calculates the necessary change in the operating conditions and sends a signal to the control device (for example, control valve) appropriately to prevent the system from entering a regime where instability will occur. The system and method presented in the invention is illustrated with two systems namely bluff body stabilized combustor with turbulent flow and aero-acoustic systems involving pipe tone. However, the method can be used in identifying the stability margins of operation for any combustor or aero-acoustic/aero-elastic or aeromechanical systems. The threshold of allowable variation in the operating conditions can be provided by an operator.

While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope.

What is claimed is:

1. A system for predicting and controlling the onset of an event in turbulent systems comprising:
    a processor, and a memory, wherein the memory comprises instructions for the processor to:
    derive a time series data from sensor signal data obtained from one or more sensors connected to the turbulent system via a signal conditioning circuitry;
    process the time series data using one of visibility graph, horizontal visibility graph or threshold grouping to derive a complex network, the complex network comprising nodes corresponding to the data, wherein connections between the nodes represent non-trivial topological features that characterize a state of the turbulent system;
    calculate network properties using the complex network, wherein the network properties include at least a global efficiency and a shortest path length of the complex network, wherein the global efficiency is a function of the shortest path length;
    compare the calculated global efficiency with that of set operating conditions to identify one of:
    a transition state, wherein the transition state includes a transition from a stable state to a precursor state of the system, or
    a precursor state, wherein the precursor state indicates an onset of an instability event in the system;
    generate a control signal if the transition state or precursor state is identified; and
    transmit the control signal to a controller, wherein the controller is configured to alter one or more operating inputs via a control device based on the control signal to restore stable operation of the turbulent system.

2. The system of claim 1, wherein the event is one of impending blowout or impending oscillatory instability.

3. The system of claim 1, wherein the network properties calculated further comprises a degree of a node, a clustering coefficient of a node, an average clustering coefficient, or a characteristic path length.

4. The system of claim 1, wherein the operating inputs altered to restore stable operation include air or fuel flow rate, degree of premixing or preheat temperature of air or fuel, length of the flame, fuel splitting, distribution of fuel or fuel injection or flame length.

5. The system of claim 1, wherein the signal conditioning circuitry comprises a signal conditioner and an analog to digital converter.

6. The system of claim 1 wherein the sensor signal data is acoustic fluctuation data or chemiluminescence intensity data.

7. The system of claim 1, wherein the turbulent system is a turbulent lifted jet flame combustor, dump combustor, bluff-body stabilized combustor, or swirl burner, combustor of an aero engine, rocket engine, propulsion system, gas turbine, furnace, thermoacoustic, aeroacoustic, aeroelastic, or air compression system.

8. The system of claim 1, wherein the turbulent system operates normally until the transition to the precursor state.

9. A method for predicting and controlling the state of a turbulent system comprising:
preprocessing, by a signal conditioning circuitry, sensor signal data obtained from one or more sensors connected to the turbulent system;
deriving, by a processor, a time series data representing the dynamics of the system;
processing the time series data to derive a complex network, the complex network comprising nodes corresponding to the data, wherein connections between the nodes represent non-trivial topological features that characterize a state of the turbulent system; wherein,
deriving the complex network comprises calculating one or more properties from the time series data by a method selected from one of: visibility graph, horizontal visibility graph or threshold grouping, wherein the properties include at least a global efficiency and a shortest path length of the complex network, wherein the global efficiency is a function of the shortest path length;
comparing the calculated global efficiency with that of set operating conditions in the system to identify one of:
a transition state, wherein the transition state includes a transition from a stable state to a precursor state of the system, or
a precursor state, wherein the precursor state indicates an onset of an instability in the system;
generating a control signal if the transition state or the precursor state is identified; and
altering, by a controller, one or more operating inputs based on the control signal to restore stable operation of the turbulent system.

10. The method of claim 9, wherein the network property calculated further comprises a degree of a node, a clustering coefficient of a node, an average clustering coefficient, or a characteristic path length.

11. The method of claim 9, wherein the state of the turbulent system further comprises a stability, an oscillatory instability or an absorbing transition.

12. The method of claim 9, wherein the instability or transition of the system is one of oscillatory instability, thermoacoustic instability, combustion instability, aero-elastic flutter, flow-induced vibration, magneto-hydrodynamic, aerodynamic, aeromechanical, aero-acoustic instability, or impending flame blowout.

13. The method of claim 9, wherein the preprocessing comprises one or more of signal conditioning or A/D conversion.

14. The method of claim 9, wherein the turbulent system operates normally until the transition to the precursor state.

15. A method for identifying and controlling the onset of flame blowout in combustion systems comprising:
preprocessing, by a signal conditioning circuitry, sensor signal data obtained from one or more sensors connected to the combustion system;
deriving, by a processor, a time series data;
processing the time series data to derive a complex network, the complex network comprising nodes corresponding to the data, wherein connections between the nodes represent non-trivial topological features that characterize a state of the combustion system;
calculating one or more network properties from the complex network, wherein the network properties include at least a global efficiency and a shortest path length of the complex network,
wherein the global efficiency is a function of the shortest path length;
comparing the calculated global efficiency with that of set normal operating conditions to identify one of:
a transition state, wherein the transition state includes a transition from a stable state to a precursor state of the system, or
a precursor state, wherein the precursor state indicates an onset of an instability in the system;
generating a control signal if the transition state or the precursor state is identified; and
altering, by a controller, one or more operating inputs based on the control signal to restore stable operation of the combustion system.

16. The method of claim 15, wherein the deriving the complex network comprises processing using a method selected from one of: visibility graph, horizontal visibility graph, or threshold grouping.

17. The method of claim 15, wherein the network properties calculated further comprises a degree of a node, a clustering coefficient of a node, an average clustering coefficient, or a characteristic path length.

18. The method of claim 16, wherein for visibility and horizontal visibility graph methods, the value of a clustering coefficient or the global efficiency increase to a positive value from zero to signify impending flame blowout.

19. The method of claim 16, wherein for the threshold grouping method, the value of a clustering coefficient drops to signify impending flame blowout.

20. The method of claim 15, wherein the operating inputs altered to restore stable operation include air or fuel flow rate, degree of premixing or preheat temperature of air or fuel, length of the flame, fuel splitting, distribution of fuel or fuel injection or flame length.

21. The method of claim 15, wherein the preprocessing comprises signal conditioning and A/D conversion.

22. The method of claim 15, wherein the sensor signal data is acoustic fluctuation data or chemiluminescence intensity data.

23. The method of claim 15, wherein the combustion system is a turbulent lifted jet flame combustor, a dump combustor, a bluff-body stabilized combustor, or a swirl burner combustor.

24. The method of claim 15, wherein the combustion system operates normally until the transition to the precursor state.

* * * * *